No. 896,631. PATENTED AUG. 18, 1908.
H. L. DIXON & G. A. MARSH.
METHOD OF SHAPING GLASS.
APPLICATION FILED APR. 18, 1904.

2 SHEETS—SHEET 1.

Witnesses
Inventors
H. L. Dixon
G. A. Marsh

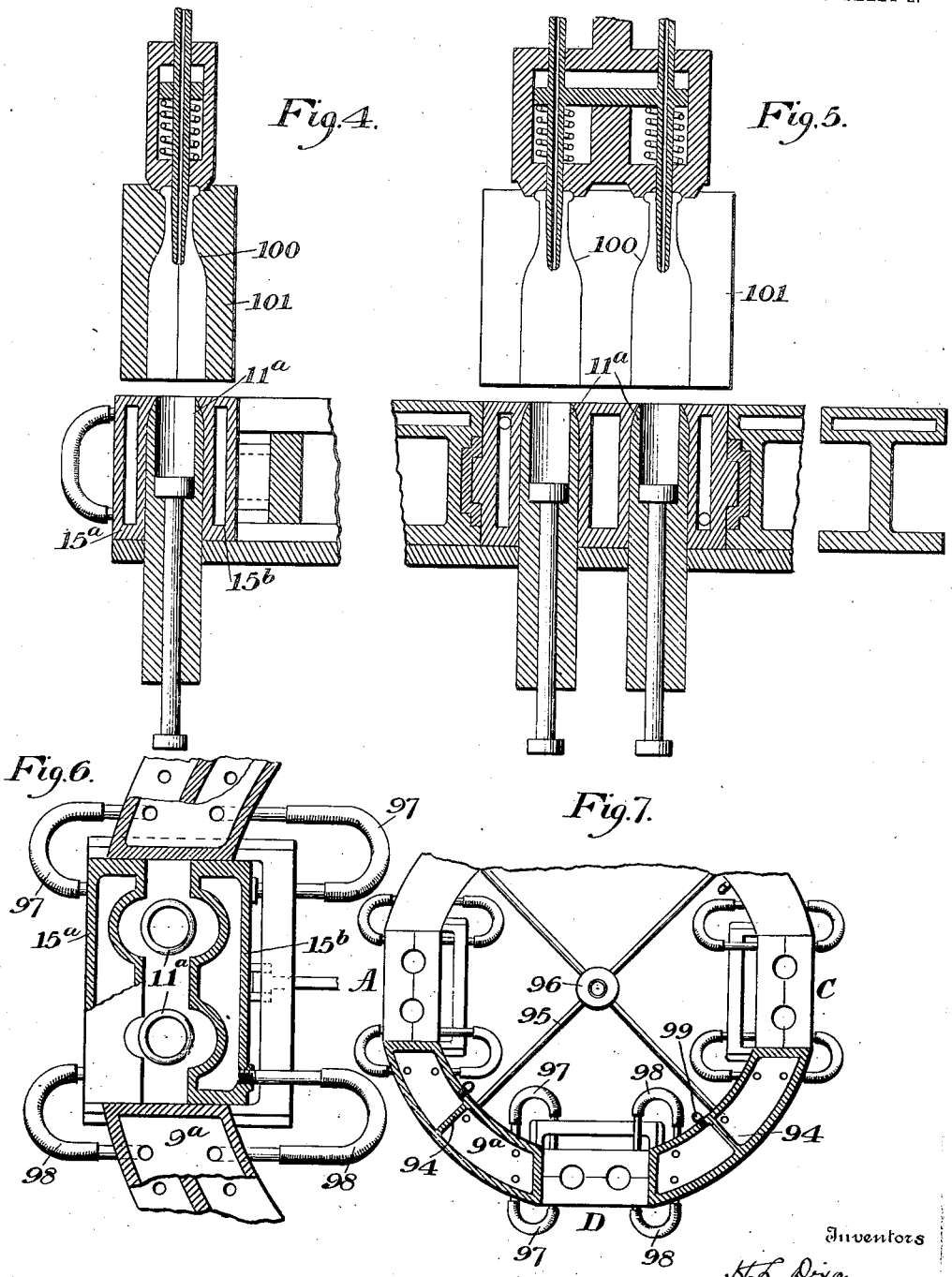

UNITED STATES PATENT OFFICE.

HENRY L. DIXON AND GEORGE A. MARSH, OF PITTSBURG, PENNSYLVANIA.

METHOD OF SHAPING GLASS.

No. 896,631.    Specification of Letters Patent.    Patented Aug. 18, 1908.

Application filed April 18, 1904. Serial No. 203,631.

*To all whom it may concern:*

Be it known that we, HENRY L. DIXON and GEORGE A. MARSH, both of Pittsburg, Allegheny county, Pennsylvania, have invented a new and useful Method of Shaping Glass, of which the following is a full, clear, and exact description, reference being had to the accompanying drawings, forming part of this specification, in which—

Figure 1:
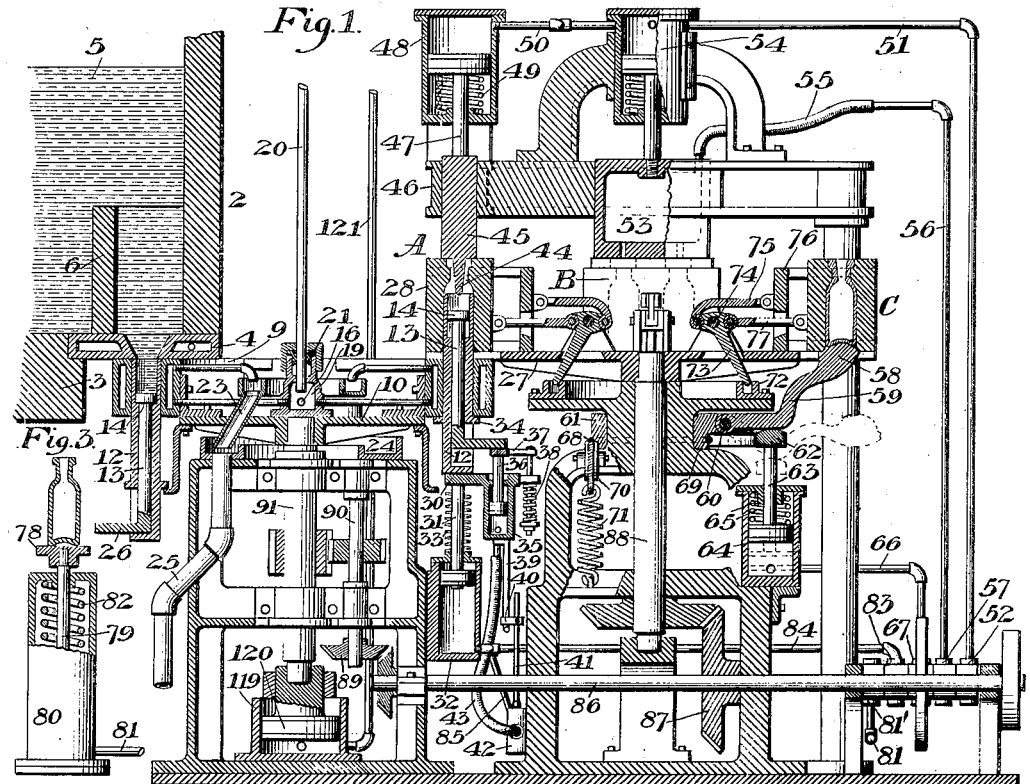
Figure 2:
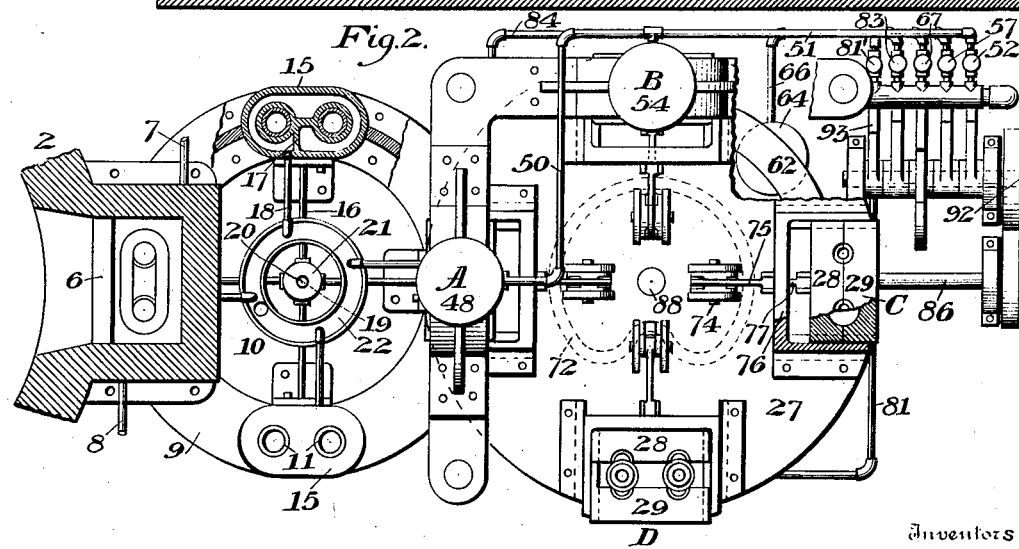

Figure 1 is a sectional side elevation showing one form of apparatus for carrying out our invention; Fig. 2 is a top plan view of the same partly broken away; Fig. 3 is a detail view of the receiving device for the articles; Fig. 4 is a sectional side elevation on a larger scale showing a modified form of the receiving cup and molds; Fig. 5 is a sectional view at right angles to that of Fig. 4; Fig. 6 is an enlarged plan view partly in section showing the cup and jacket of this modification; and Fig. 7 is a partial plan view of the table showing the water connections.

Our invention relates to the form of hollow glass articles and is designed especially to provide a new method for supplying glass from the tank or receptacle to the molds.

It is further designed to provide for pressing the glass in the mold and further to provide automatic apparatus for completing the article after pressing.

In the drawings, referring to the form of Figs. 1, 2 and 3, 2 is a portion of a furnace resting on the usual bottom blocks 3, one of which is cut away to receive the water-cooled bottom plate 4. This bottom plate is provided with a central opening or openings through which the glass flows out under the head of the bath 5 in the tank. In order to supply the best quality of glass in the tank to the molds, we preferably provide the vertical partition 6 which projects upwardly from the bottom to a point below the level of the glass. The intermediate layers of glass in the bath are of a better quality than those at the bottom or top and by this diaphragm 6 we provide a well which receives the better grade of glass from the bath. The hollow plate 4 may be water-cooled by suitable inlet and outlet pipes 7 and 8. The bottom of this plate 4 is plain faced and is arranged to contact with a horizontal ring 9 carried on the rotating frame 10 and having four sets of cups 11 with their upper ends flush with the top face of the ring. The cups 11 are arranged in sets of preferably two in number and are formed at the upper ends of the vertically moving plungers 12 containing the stems 13 each of which carries the bottom 14 for the cup. The cups fit within vertical holes in water-jacketed housings 15 shown in Figs. 1 and 2. As shown in Fig. 2 each of these housings surround the set of cups and receives water through the radial pipe 16 on one side of the partition 17 whence the water flows around the water jacket and out through the pipe 18. The pipe 16 leads from a central hollow hub 19 to which water is supplied through pipe 20 leading downwardly through suitable stuffing box 21. The pipe 18 discharges into an open annular trough 22 from which water discharges through pipe 23 into a stationary trough 24 whence it flows out through the outlet pipe 25. The water jackets are thus continuously supplied with the water circulation, in any and all positions of the rotating frame. The cup plungers 12 are slotted upon one side to receive the projection 26 by which the cup bottom is raised. The frame is rotated intermittently, being given a quarter turn and at each stop a set of the cups is brought beneath the outlet slot in the water-cooled plate 4.

Outside the rotating frame 10 is a rotary table 27 which carries four sets of molds which are open bottom and are made in two parts 28 and 29. The table 27 is positioned above the rotating frame 10, so that at each quarter rotation of the two tables, a set of molds is brought into alinement with a set of cups containing the glass. When the cups are thus positioned below the mold, the cup plunger 12 is lifted by a cross head 30 secured at the upper end of piston rod 31 of a pneumatic cylinder 32. The cross head is normally drawn down by a pair of springs 33 which act when the motive fluid is cut off from the cylinder. When fluid is admitted to the cylinder the cross head 30 moves upwardly and forces the cups up into the matrix cavities of the mold until the projections 34 on the cup plunger engage the bottom of the water jacket. The cross head 30 carries with it a small motive cylinder 35 whose piston rod 36 carries a presser bar 37 which is normally drawn down by spring 38. To the bottom of this small cylinder is attached a tappet rod 39 having a projection engaging a tappet 40 upon a valve rod 41 leading to the valve 42 which controls the air passing therefrom. Through the flexible pipe 43 to the cylinder 35 as the piston in cylinder 32 reaches the upper end of its travel, the rod 39 actuates the tappet on the valve rod and opens the valve whereupon the fluid pressure enters the cylinder 35, which acting on a projection on stem 13 forces the cup bottom upwardly and presses the neck of the bottle by forcing the glass up against the plunger 44 which has been moved down into the mold cavity. These plungers 44 are secured to a block 45 sliding through a cross-head 46 and actuated by a piston on the piston rod 47 of a motive cylinder 48. The piston is normally raised by spring 49 and the cylinder receives fluid through pipe 50 which forms a branch of pipe 51 leading from a valve 52. From this pressing station A the next quarter turn of the table brings the mold to the blowing station B. At this station the blow head 53 is forced down on the top of the mold by a motive cylinder 54 which receives air from pipe 51. The blow head is supplied with air through a flexible pipe 55 leading from pipe 56 connected to valve 57. At each stop of the table the blow head is moved down and air then enters the blow head and expands the articles to final form. Before this takes place the open bottom molds are closed by movable bottoms 58 which are secured to a hinged bracket 59 pivoted at 60 to a ring 61 surrounding the hub of the table or carrier. The hinged bracket 59 travels upon and is raised and lowered by an arc-shaped support 62 which is raised and lowered by the piston rod 63 of the pneumatic cylinder 64, whose piston is normally pressed down by spring 65. The cylinder 64 is supplied with air through pipe 66 leading from valve 67. A flexible cable 68 is secured to the ring at one side at 69 and extends around the ring and over pulley 70 to spring 71. This spring acts to normally draw the mold bottoms into registry with the molds at the station B where a stop on the arc-shaped support 62 holds them in registry with the molds. When they are thus drawn into registry with the mold at station B fluid is admitted to the cylinder 64 which acts to force the mold bottoms up into the open lower ends of the mold cavities. The cylinder then holds them elevated during the next quarter turn and until they are stopped at station C. As soon as they reach this station the fluid is exhausted from cylinder 64, the spring therein draws down the support 62, the bracket 59 swings down by gravity and the cord at once turns the ring until the mold bottom has again reached the station B. The fluid is then again admitted to the cylinder 64 to move the mold bottoms up into engagement with the next set of molds.

From the station C the mold travels to the ejecting station D and during this travel the articles chill and set in the molds. During the latter part of its travel the mold is opened by the cam 72 acting upon the three-armed lever 73 pivoted at 74. One arm of this lever is connected by link 75 to the yoke 76 secured to the outer half of the mold; while the other arm is connected by link 77 extending through the yoke and pivoted to the inner half of the mold. The cam is shaped as shown in Fig. 2, so that as the mold reaches station D the mold halves will be drawn apart and the bottles received upon the cross head 78 secured at the upper ends of pistons or piston rods 79 of motive cylinder 80 supplied through pipe 81 and containing the spring 82 by which the piston is normally forced down. The pipe 81 leads to valve 81'. The valve 83 controls pipe 84 leading to motive cylinder 32 and having a branch 85 leading to valve 42.

We have shown the tables as turned by shaft 86 having beveled gearing 87 driving the shaft 88 of the mold table and beveled gearing 89 driving shaft 90 which is geared to the shaft 91 carrying the table or frame for the cups.

The shaft 86 is rotated intermittently by mutilated gear connection with a constantly rotating shaft 92 carrying suitable tappet devices 93 by which the valves are actuated at the proper times.

The operation of the apparatus is as follows:—At each stop of the tables a set of cups is filled from the tank. During the next quarter turn these cups move to the second station and rest until the next turn at which they are brought into registry with a set of molds at station A. As they stop at this point the plungers are moved down into the tops of the molds and the cups are forced up in the molds to the desired distance. The cup bottoms are then forced up to press the bottle mouths around the plungers. The cups and cup bottoms then drop and the mold plungers are raised. The table then moves the next quarter turn and the molds are brought to the station B. At this stop the blow head is depressed and air is supplied to it to expand the articles in the molds. During the travel of the articles from the pressing station to the blowing station the mold bottoms are open and the glass blank elongates slowly under the action of gravity. As the molds reach the blowing station, the mold bottoms are brought into registry therewith by the spring and cord and are raised by the cylinder, so that the molds are closed during the blowing operation. The blow head is then raised and air cut off from it and during the next quarter turn the mold bottoms travel with the molds being held therein by entering their open lower ends. At station C the mold bottoms are lowered and swung back to station B and during the next quarter turn the mold travels to the ejecting station D where it is opened and the finished articles received on the support.

The air is supplied to and cut off from the various motive cylinders and blow-head automatically through the valves which are actuated by the tappet devices moved by the continuously rotating shaft.

In forming bottles having a less abrupt neck and provided with a long sloping shoulder leading to the neck, the cups shown in Fig. 1 would leave a ring-shaped mark at the shoulder. To overcome this difficulty we may use the form of Figs. 4, 5, 6 and 7. In this form the cup chill is made in two halves 15$^a$ and 15$^b$, which may be moved toward and from each other at proper intervals by any suitable connections, such as those shown for the mold halves in Fig. 1. In this case the ring 9$^a$ is made into hollow water-cooled sections, each section having a partition 94 dividing it into two chambers. Into one of these chambers leads the supply pipe 95 from the central hub 96, the water flowing therefrom through flexible pipes 97 into the halves of the water jacket. From the other end of the water jacket the water flows through pipes 98 into the other chamber of the next section of the ring, whence it flows out through pipe 99 into a suitable annular trough or open table. A constant water circulation is thus maintained through the moving mold halves and through the sections of the ring. In this case the cup 11$^a$ is beveled or rounded off in its upper exterior portion, so that it will fit approximately against the sloping shoulder 100 of the mold 101. By this means the abrupt shoulder on the blank is obviated and the mark will not appear on the finished article. So of course the water-jacket is drawn apart before the cup and bottom are forced up into the mold. Otherwise the apparatus may be substantially similar to that of Figs. 1, 2, and 3.

In the forms of Figs. 1 to 7 inclusive we preferably support the shaft for the cup table upon a hydraulic balance. Thus in Fig. 1, we show a lower chamber or cylinder 119 containing the hydraulic plunger 120 which forms the step bearing for the shaft 91. Water is supplied to this chamber below the plunger through the stand pipe 121. By regulating the head of water in the stand pipe, the upward pressure on the cup table may be regulated so as to allow turning of the table and we press the cup ring against the water-cooled outlet plate to seal the joint between them.

The advantages of our invention result from the feeding of the glass into a cup or receptacle, using the head of glass in the tank or chamber containing the molten glass, the glass then being fed from the cup into the mold. It also results from the automatic filling of the cup from the tank and the automatic moving of the cup into the mold and pressing of the article therein.

Many changes may be made in the form and arrangement of the apparatus without departing from our invention.

We claim:—

1. The method of supplying glass to molds, which consists in flowing the molten glass by gravity from a furnace into a receptacle and then feeding the glass from the receptacle directly into a forming mold; substantially as described.

2. The method of forming glass, consisting in flowing molten glass by gravity from a furnace into a receptacle, and then moving the receptacle with its contents into a forming mold, and shaping the glass within the mold; substantially as described.

3. The method of filling glass molds, which consists in flowing the glass by gravity from the bath at a point below its level into a receiving vessel, transferring the receiving vessel with its contents into the mold, and then shaping the glass in the mold; substantially as described.

4. The method of transferring molten glass from a furnace into molds, which consists in flowing the glass by gravity from the bath in the furnace into a receptacle, moving the receptacle in the plane of the mouth of the flowing-out opening past the said opening to close the same, and then introducing the glass into a forming mold and shaping it therein; substantially as described.

5. The method of forming glass, which consists in flowing molten glass by gravity from a furnace bath into a receptacle, chilling the glass by radiation as it flows into the receptacle, moving the receptacle in the plane of the mouth of the flowing-out opening across the said opening to close the latter, and then transferring said receptacle and its contents into a forming mold and shaping the glass therein; substantially as described.

6. The method of supplying glass to molds, which consists in moving a carrier to present a receptacle to a feed-out opening below the level of the molten glass in the bath, moving the receptacle at an angle to the plane of movement of the carrier, and against the feed-out opening, feeding the glass by gravity through the opening into the receptacle, then moving the receptacle to close the opening and actuating the carrier to remove the receptacle, and then transferring the glass into a mold and shaping it therein; substantially as described.

7. The herein described method of transferring molten glass from a bath or furnace to a forming mold, which consists in flowing the glass by gravity from the bath at a point below its level into a receiving vessel, and then transferring the receiving vessel with its contents into a mold; substantially as described.

8. The herein described method of transferring molten glass from a bath or furnace to a forming mold, which consists in flowing the glass by gravity from the bath at a point below its level, into a receiving vessel, chilling the glass during its flow, and transferring the receiving vessel with its contents into a mold; substantially as described.

In testimony whereof, we have hereunto set our hands.

HENRY L. DIXON.
GEORGE A. MARSH.

Witnesses:
JOHN MILLER,
H. M. CORWIN.